(No Model.)

P. W. MACKENZIE.
APPARATUS FOR THE MANUFACTURE OF ILLUMINATING GAS.

No. 418,649. Patented Dec. 31, 1889.

Witnesses:—
D. H. Haywood
C. Lundgren

Inventor.—
Philip W. Mackenzie
by his Attorneys
Brown & Griswold

UNITED STATES PATENT OFFICE.

PHILIP W. MACKENZIE, OF NEW YORK, N. Y., ASSIGNOR TO THE FUEL GAS AND LIGHT IMPROVEMENT COMPANY OF AMERICA, OF SAME PLACE.

APPARATUS FOR THE MANUFACTURE OF ILLUMINATING-GAS.

SPECIFICATION forming part of Letters Patent No. 418,649, dated December 31, 1889.

Application filed July 24, 1889. Serial No. 318,559. (No model.)

*To all whom it may concern:*

Be it known that I, PHILIP W. MACKENZIE, of New York, in the county and State of New York, have invented a certain new and useful Improvement in Apparatus for the Manufacture of Illuminating-Gas, of which the following is a specification.

My invention relates to apparatus for the manufacture of illuminating-gas from liquid hydrocarbon, water in the form of steam, and oxygen or air, which gas consists particularly of hydrogen, carbonic oxide, marsh-gas, and carbon.

I will describe in detail apparatus embodying my improvement, and then point out the novel features in claims.

Figure 1:
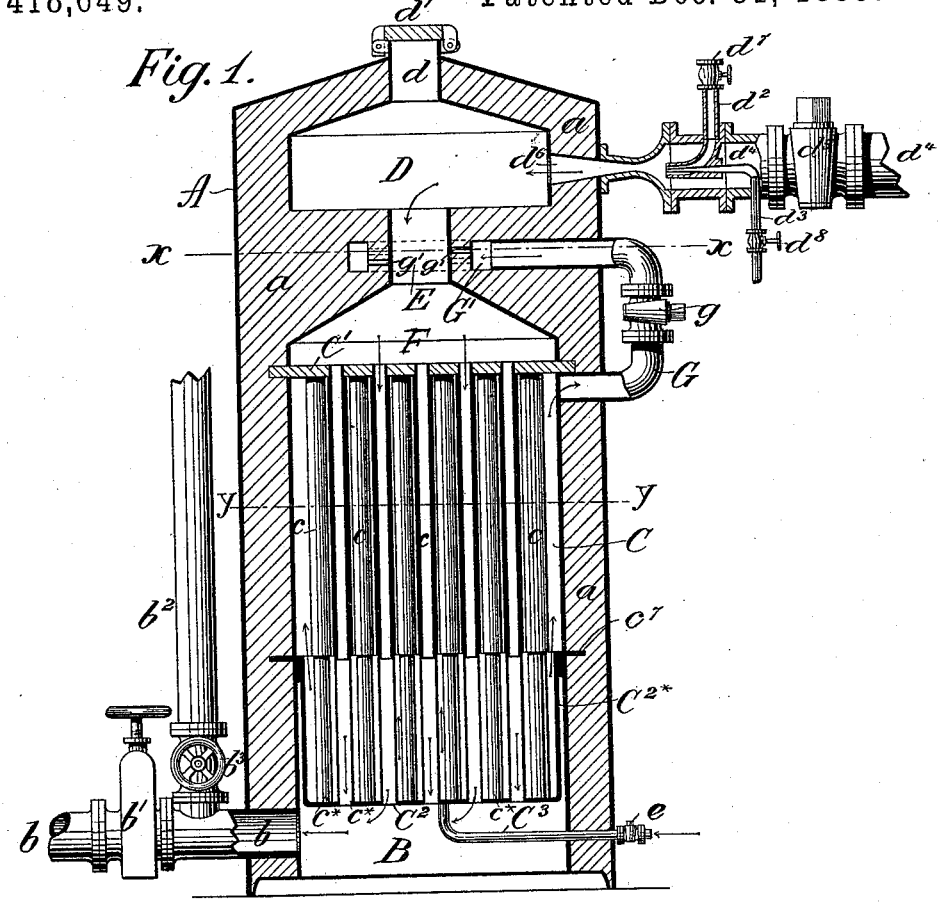
Figure 2:
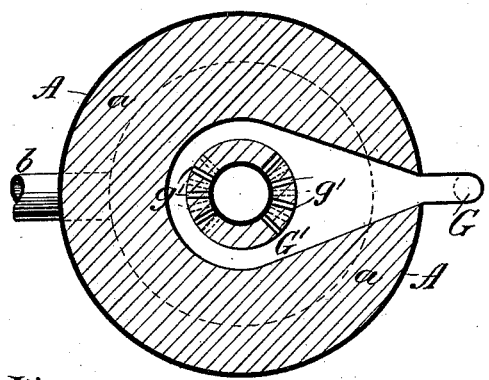
Figure 3:
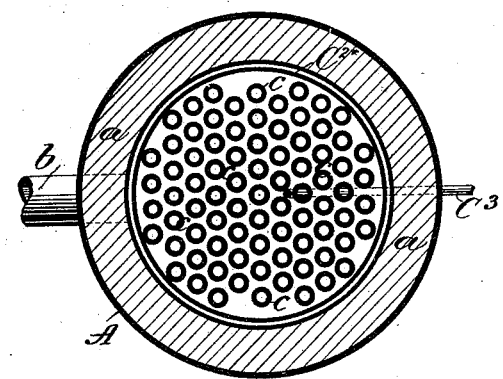

In the accompanying drawings, Figure 1 is a vertical section of apparatus embodying my improvement. Fig. 2 is a horizontal section taken on the line $x\ x$, Fig. 1. Fig. 3 is a horizontal section taken on the line $y\ y$, Fig. 1.

Similar letters of reference designate corresponding parts in all the figures.

A designates the main shell or body of the apparatus. As shown, this shell is cylindrical and it may be made of metal. Within the shell A, and forming a lining $a$ therefor, is placed fire-brick or any other suitable refractory material of any desired thickness. In the lower portion of the body there is formed a chamber B, into which chamber the permanent gas, after having been manufactured, is received, and from which it may be discharged through an outlet-pipe $b$, provided with a suitable valve $b'$. I have shown as extending from the pipe $b$ a stack $b^2$, provided with a valve or damper $b^3$. Above the chamber B is an evaporator and superheater C. This evaporator and superheater comprises, as here shown, a number of vertically-extending cylindrical tubes $c\ c^x$, a sufficient number of such tubes being employed to nearly fill the space in which they are inclosed by the refractory material $a$.

The portions $c$ of the tubes are made of any suitable refractory material—such, for instance, as fire-clay. The upper ends of said tubes are received in a tube-plate C', which tube-plate extends entirely over the upper end of the evaporating and superheating chamber, and is, as shown, supported at its edges within the refractory material $a$. The said portions $c$ of the tubes are shown as shouldered near their upper ends, where they extend through the tube-plate C'. Near their lower ends the portions $c$ are also shouldered and are received within the portions $c^x$ of the tubes, which portions are by preference made of metal, and open at their lower ends through a tube-plate $C^2$ and into the chamber B. The said portions $c^x$ of the tubes are in this instance arranged in a receptacle $C^{2x}$, also preferably made of metal, and provided near its upper edge with a horizontally-extending flange $c^7$, supported in the refractory material $a$.

Into the receptacle $C^{2x}$ hydrocarbon oil to be evaporated and superheated is delivered through a pipe $C^3$, provided with a cock $e$. The hydrocarbon thus delivered into the receptacle $C^{2x}$ fills or partially fills the space between the portions $c^x$ of the tubes, and when evaporated passes upwardly about the portions $c$ of the tubes in manner about to be described.

D designates a converter or decomposing-chamber located in the upper portion of the case or body of the apparatus. This converter is covered by a top or crown of sufficient thickness to prevent loss of heat by radiation, and is provided with an outlet $d$ upon its upper side, which may be closed by a cap or cover $d'$.

Into the converter D, I inject a mixture of liquid hydrocarbon, superheated steam, and oxygen or air. I prefer to introduce this mixture by means of an injector comprising a pipe $d^2$, provided with a cock $d^7$. The steam is preferably superheated. With the injector communicates a pipe $d^3$, provided with a cock $d^8$, and through which the liquid hydrocarbon is drawn by the entering steam. At the same time oxygen or air in suitable quantities is drawn in through a pipe $d^4$, in which is a cock $d^5$. The mixing of the hydrocarbon, steam, and air or oxygen occurs outside the converter D, and enters the latter through an opening or tuyere $d^6$, in a thoroughly-mixed condition.

In starting the apparatus the cover $d'$ is raised and the mixed hydrocarbon, steam, and air or oxygen is ignited. When thoroughly ignited, the cover $d'$ is closed and combustion then takes place in the converter. The intensely-heated products of combustion pass downwardly through a contracted neck or passage E, forming a mixing-chamber, and located about centrally in the bottom of the converter and communicating at its lower end with a chamber F above the evaporator and superheater C. At this time the valve $b'$ in the pipe $b$ is closed and the valve or damper $b^3$ in the stack $b^2$ is open. The products of combustion from the chamber F pass downwardly through the tubes $c\ c^x$, and thence into the chamber B below the evaporator and superheater, from which they are carried off through the stack $b^2$. This preliminary operation is for the purpose of thoroughly heating the converter D and the evaporator and superheater C, and in carrying it out I prefer to use only a limited amount of steam and a certain amount of hydrocarbon.

A proper degree of heat having been obtained, I somewhat increase the supply of steam and liquid hydrocarbon. Liquid hydrocarbon is at this time admitted through the pipe $C^3$ to the receptacle $C^{2x}$ in any desired quantity. The superheated hydrocarbon vapor then passes upwardly about the tubes $c\ c^x$, and thence through a pipe G, provided with a cock $g$ into a vapor-chamber G', surrounding the mixing-chamber E, and communicating with the latter through a number of openings or tuyeres $g'$. The mixing-chamber E and vapor-chamber G' constitute, in effect, a carburetor and carbonizer, whereby the lean gas from the converter or decomposing-chamber is enriched by the hot hydrocarbon vapors from the evaporator and superheater. In the converter D the oxygen or the oxygen of the air and steam combine with the carbon of the liquid hydrocarbon to produce combustion and decomposition, thereby liberating the hydrogen from the steam and hydrocarbon by decomposition, whereby carbonic acid and hydrogen are produced. Additional carbon or hydrocarbon admitted through the pipe $d^3$ absorbs the oxygen from the carbonic acid, thereby forming carbonic oxide. If this additional carbon or hydrocarbon were not thus introduced, however, the carbonic acid would be absorbed while the gas from the converter was passing through the mixing-chamber E, there producing the same result. The highly-superheated carbon vapors from the evaporator and superheater are delivered in fine jets through the passages or tuyeres $g'$ into the hydrogen and carbonic oxide descending from the converter. The hydrocarbon vapor by being thus thrown in atomized contact with those gases while they are incandescent or at a very high temperature undergoes distructive distillation and is converted into a permanent gas.

By making the portions $c$ of the tubes $c\ c^x$ of refractory material and conveying the gaseous products directly down through such tubes not only is the life of the portion of the tubes which is subjected to the greatest heat materially prolonged, but a complete volatilization of the hydrocarbon is readily effected, and it is more highly superheated than would be the case were such portions of the tubes made of a different material.

The highly-superheated carbon vapor may be taken from the pipe G directly into the pipe $d^3$, and the supply of liquid hydrocarbon cut off from the pipe $d^3$, if desired. The only supply of carbon will then be the vapor.

If any carbon should remain unconverted, it may be condensed out by an ordinary condenser and used over again.

When nitrogen is present or produced—as when air is used—it is neutralized by the hydrocarbon.

The permanent gas is conveyed away through the pipe $b$, the valve $b'$ being of course open and the valve or damper $d^3$ of the stack being closed, and is then washed, scrubbed, purified, and otherwise treated in the usual manner.

More than one injector for introducing hydrocarbon, steam, and oxygen or air to the chamber D may be used, if desired.

Although I have represented the apparatus as extending vertically, so that products of combustion pass downwardly, it might of course be arranged in other positions and such products be otherwise directed.

What I claim as my invention, and desire to secure by Letters Patent, is—

1. In an apparatus for manufacturing illuminating-gas, the combination, with a shell or body, of an evaporator and superheater located therein and comprising pipes of refratory material, through which the heated gaseous products will pass, a carburetor and carbonizer above the evaporator and superheater, a pipe or passage effecting communication between the evaporator and superheater and the carburetor and carbonizer, a converter or decomposing-chamber above the carburetor and carbonizer and communicating therewith, a passage for steam, hydrocarbon, and oxygen or air communicating with said converter or decomposing-chamber, and an outlet for permanent gas below the evaporator and superheater, substantially as specified.

2. In an apparatus for manufacturing illuminating-gas, the combination, with a shell or body, of an evaporator and superheater located therein and comprising pipes composed of sections, one of which sections is of refractory material and the other of which is of metal, through which tubes the heated gaseous products will pass, a carburetor and carbonizer above the evaporator and superheater, a pipe or passage effecting communication between the evaporator and superheater and the carburetor and carbonizer, a converter or decomposing-chamber above the carburetor and carbonizer and communicating therewith, a passage for steam, hydrocarbon, and oxygen or air communicating with said converter or decomposing-chamber, and an outlet for permanent gas below the evaporator and superheater, substantially as specified.

PHILIP W. MACKENZIE.

Witnesses:
HERMAN D. AUSTIN,
GEO. A. BAKER.